United States Patent
Azara et al.

(10) Patent No.: US 7,415,414 B2
(45) Date of Patent: Aug. 19, 2008

(54) SYSTEMS AND METHODS FOR DETERMINING AND USING INTERACTION MODELS

(75) Inventors: Misty Azara, Seattle, WA (US); Livia Polanyi, Palo Alto, CA (US); Giovanni L. Thione, San Francisco, CA (US); Martin H Van Den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 704 days.

(21) Appl. No.: 10/807,009

(22) Filed: Mar. 23, 2004

(65) Prior Publication Data

US 2005/0182618 A1    Aug. 18, 2005

Related U.S. Application Data

(63) Continuation-in-part of application No. 10/781,443, filed on Feb. 18, 2004.

(51) Int. Cl.
G10L 15/22    (2006.01)
(52) U.S. Cl. .................................. 704/270; 704/275
(58) Field of Classification Search ............... 704/270, 704/275
See application file for complete search history.

(56) References Cited

U.S. PATENT DOCUMENTS

| 5,751,907 | A | 5/1998 | Moebius et al. | |
|---|---|---|---|---|
| 5,790,978 | A | 8/1998 | Olive et al. | |
| 2004/0049391 | A1* | 3/2004 | Polanyi et al. | 704/271 |
| 2005/0086592 | A1 | 4/2005 | Polanyi et al. | |
| 2005/0171926 | A1 | 8/2005 | Thione | |
| 2005/0182625 | A1 | 8/2005 | Azara et al. | |
| 2005/0187772 | A1 | 8/2005 | Azara et al. | |

OTHER PUBLICATIONS

Jurafsky et al.; Automatic Detection of Discourse Structure for Speech Recogntion and Understansing; Automatic Speech Recognition and Understanding, 1997. Proceedings., 1997 on Dec. 14-17, 1997 pp. 88-95.*

Levow, G., "Prosodic Cues to Discourse Segment Boundaries in Human-Computer Dialogue", in 5th SIGdial Workshop on Discourse and Dialogue Boston, Apr. 30 and May 1, 2004.

Lascarides, A. and Oberlander, J., "Temporal Coherence and Defeasible Knowledge", Theoretical Linguistics, 19.1, pp. 1-35, Walter de Gruyter, Berlin, New York, 1993.

"CHATR: A Generic Speech Synthesis System", Dec. 25, 1997, downloaded from http://feast.atr.jp/chatr/manual/index.html Mar. 16, 2006.

(Continued)

Primary Examiner—Abul K. Azad
(74) Attorney, Agent, or Firm—Sughrue Mion, PLLC (57) ABSTRACT

Techniques are provided for determining and using interaction models. Discourse functions, prosodic features and turn information are determined from the speech information in a training corpus. Statistics, decision trees, rules and/or various other methods are used to determine a predictive interaction model based on the discourse functions, the prosodic features and the turn information. Predictive interaction models are optionally determined for individual users, genres, languages and/or other characteristics of the speech information. The predictive interaction model is useable to predict turns in a dialogue based on the discourse functions and prosodic features identified in the speech information. Speech information is presented and/or received based on the predictive interaction model.

20 Claims, 6 Drawing Sheets

OTHER PUBLICATIONS

"HCRC Project: ID4S Intonation in Dialogue for Speech Recognition", downloaded from http://www.hcrc.ed.ac.uk/Site/IDS4.html Jun. 2, 2004.

Nuance Say Anything Grammars product description, downloaded from http://cafe.bevocal.com/docs/grammar/sayanthing.html Jun. 2, 2004.

Ljolje, A., "The AT&T LVCSR-2001 System", May 3, 2001, downloaded from ftp://jaguar.ncsl.nist.gov/evaluations/hub5/may01/pres/att_lvcsr.pdf Mar. 16, 2006.

DARPA Communicator Project: Robust Recognition and Dialog Tracking for Interactive Information Access, Mar. 2003, downloaded from http://ssll.ee.washington.edu/projects/communicator.html Mar. 15, 2006.

Ayers, G.M., 1992. "Discourse functions of pitch range in spontaneous and read speech." Presented at the Linguistic Society of America Annual Meeting.

Brown, G. and Kenworthy, J. 1980 Questions of Intonation, Baltimore, University Park Press, p. 21-122.

Kamp, H. 1981. "A Theory of of Truth and Semantic Representation." in J.A.G. Groenendijk, T. Jannssen, and M. Stokhof (eds.) Formal Methods in the Study of Language. Amesterdam: Mathematisch Centrum, 277-322.

Ladd, D.R. 1983, "Phonological Features of Intonation Peaks", Language, 59:721-759.

Ladd, D.R. 1998. "Declination Reset and the Hierarchical Organization of Utterances" Journal of the Acoustical Society of America, 84(2):530-544.

Mariani, J.; Proubeck, P., 1999 "Language Technologies Evaluation in the European Framework", Proceedings of the DARPA Broadcast News Worksop, Washington: Morgan Kaufman Publishers, pp. 237-242.

Nakatani, C.; Hirschberg, J.; and Grosz, 1995. "Discourse Structure in Spoken Language: Studies on Speech Corpora." In Working Notes of the AAAI-95 Spring Symposium in Palo Alto, CA in Empirical Methods in Discourse Interpretation. pp. 106-112.

Polanyi, L.; and Sch, R., 1984. "A syntactic approach to discourse semantics." Proceedings of the 10th International Conference on Computational Linguistics, Stanford, CA 413-419.

Silverman, K.; Beckman, M.; Pierrehumbert, J.; Ostendorf, M.; Wightman, C.; Price, P.; and Hirschberg, J. 1992. "ToBI: A standard scheme for labeling prosody." In Proceedings of ICSLP. Banff: International Conference on Spoken Language Processing.

Terken, J. 1984. "The distribution of pitch accents in instructions as a function of discourse structure." Language and Speech, 27:269-289.

Black A.; Taylor, P.: CHATR: a generic speech synthesis system in Proceedings of COLING74, II p. 83-986, Kyoto, 1994.

Haller, S. Fossum, T.: "The Association Between Subject Matter and Discourse Segmentation", In The Proceedings of the Florida AI Research Symposium, Key West, FL, May 2001.

Long, S.; Kooper, R.;Abowd, G.; Atkeson, C., "Rapid Prototyping of Mobile Context-Aware Applications: the CyberGuide Case Study", in the Proceedings of the 2nd ACM International Conferenece on Mobile Computing and Networking (MobiCom'96), pp. 97-107, Nov. 10-12, 1996.

Shriberg., E.; Stolke, A.; Hakkani-Tur, Dilek; Tur, Gokhan, "Prosody-Based Automatic Segmentation of Speech Utterances into Sentences and Topics" in Speech Communication, 2000, 32, 1-2, Sept, pp. 127-154.

Stolcke., A.; Schriberg, E.; Bates, R.; Coccaro N.; Jurafsky, D.; Martin, R.; Meteer, M.; Ries, K.; Taylor, P.; Van Ess-Dykema, C., "Dialog Act Modeling for Conversational Speech" in Applying Machine Learning to Discourse Processing. Papers from the 1998 AAAI Spring Symposium, Technical Report SS-98-01 (J. Chu-Carroll et al. eds.) Stanford CA pp. 98-105, AAAI Press, Menlo Park CA. 1998.

Wrede, B.; Schriberg, E., "Spotting 'HotSpots' in Meetings: Human Judgments and Prosdic Cues" in Proc. Eurospeech, Geneva, 2003.

* cited by examiner

| USER ID | PROSODIC FEATURES | PRECEDING DISCOURSE FUNCTION SEQUENCE | TRAILING DISCOURSE FUNCTION SEQUENCE | PREDICTION |
|---|---|---|---|---|
| A13D | DF[LAST].PF[SILENCE_TRAILING] > 0.10; | (A1-A6)A1A4; | | 0.60 |
| A13D | { (DF[FIRST].PF[PITCH_FREQUENCY_INITIAL] > 110); (DF[LAST].PF[STRESS].SEGMENT.LAST == TRUE); } | { (A1-A8)A2A2A9; .A1A3 +A9; } | A8A1; | 0.75 |
| . | . | . | . | . |
| . | . | . | . | . |
| B24F | DF[LAST-1].PF[SILENCE_TRAILING] > 0.15; | .(A1-A6)A1A4; | A3.A2; | 0.64 |

710 OPTIONAL    720    730    740    750

Fig. 6

SYSTEMS AND METHODS FOR DETERMINING AND USING INTERACTION MODELS

This application is a continuation-in-part of currently pending U.S. application Ser. No. 10/781,443, filed on Feb. 18, 2004.

INCORPORATION BY REFERENCE

This Application herein incorporates by reference:
U.S. patent application Ser. No. 10/781,443, entitled "Systems and Methods for Determining Predictive Models of Discourse Functions" by M. Azara et al.;
U.S. patent application Ser. No. 10/785,199, entitled "Systems and Methods for Synthesizing Speech Using Discourse Function Level Prosodic Features" by M. Azara et al.;
U.S. patent application Ser. No. 10/807,532, entitled "System and Methods for Resolving Ambiguity" by M. Azara et al.;
U.S. patent application Ser. No. 10/684,508, entitled "Systems and Methods for Hybrid Text Summarization" by L. POLANYI et al., each, in their entirety.

BACKGROUND OF THE INVENTION

1. Field of Invention
This invention relates to natural language processing.
2. Description of Related Art
Natural language speech offers a number of advantages over conventional keyboard, tactile and other interfaces. Natural language interfaces are among the earliest interfaces learned. Natural language interfaces are among the most intuitive interfaces for users which may reduce cognitive effort in accomplishing certain tasks.

Many command and control systems, knowledge repositories and order taking systems already benefit from conventional natural language speech interfaces. However, these conventional information retrieval systems lack any notion of how to facilitate user interaction. Instead, these conventional systems impose a protocol of interaction on the user. Typically the interaction protocol is created by the interface designer and assumes that the task dialogue is the focus of the user's attention.

In contrast, human-human dialogue uses prosodic features and sequences of discourse functions to indicate appropriate speech presentation strategies. For example, prosodic features and discourse function sequences indicate the turn sequences in the exchange of information. Silences following speech utterances may be used by one dialogue participant to indicate an expected response from another participant. Changes in pitch frequency, rate of speech and/or other prosodic features can be used to indicate questions and/or interrogatory remarks. Similarly, patterns of speech, characteristic discourse functions sequences and/or other presentation strategies are used to indicate turns in the dialogue.

Conventional human-computer natural language interfaces lack appropriate interaction models. That is, conventional natural language interfaces merely present speech information as requested and/or accept speech information when it is presented. A user of a conventional human-computer natural language interface must therefore devote cognitive resources to understanding the appropriate timing and turn taking necessary to interact with these conventional interfaces.

For example, some information retrieval systems implementing these conventional natural language interfaces accept certain types of information only at specified time intervals or only in response to certain prompts. When an information request is received, these conventional information retrieval systems immediately schedule the presentation of the requested information. That is, these conventional systems assume that the human-computer dialogue is the primary dialogue. The immediate presentation of information can distract the focus of attention if the user is interacting with human and/or devices controlled by conventional natural language interfaces. The re-direction of the user's attention creates cognitive thrashing as the user attempts to switch between partially completed tasks.

In human-human interactions, the competition for the user's focus of attention is mediated by the interaction model of the human speakers. However, when the user interacts with systems that lack appropriate interaction models, a greater cognitive load is imposed since the user is forced to follow the interaction model of the system. The user's attention is re-directed from completing the task, to the specifics of how to complete the task. These shifts in the focus of attention reduce the effectiveness of these conventional natural language interfaces. As the number of devices incorporating these conventional natural language interfaces increase, these focus of attention problems also increase.

SUMMARY OF THE INVENTION

Thus, natural language interfaces that determine and adjust to the user's interaction model would be useful. Moreover, natural language interfaces that determine and adapt to the user's characteristic speech patterns would also be useful. The systems and methods according to this invention determine the discourse functions, prosodic features and turn information for a training corpus of speech information. Predictive interaction models are determined based on the discourse functions and prosodic features associated with each identified turn in the training corpus. The discourse functions and prosodic features in non-training speech information are determined. The dialogue turns are then predicted based on the predictive interaction model, the determined discourse functions and the prosodic features. Speech input and/or output is scheduled based on the predictive interaction model.

DETAILED DESCRIPTION OF EXEMPLARY EMBODIMENTS

Figure 1:
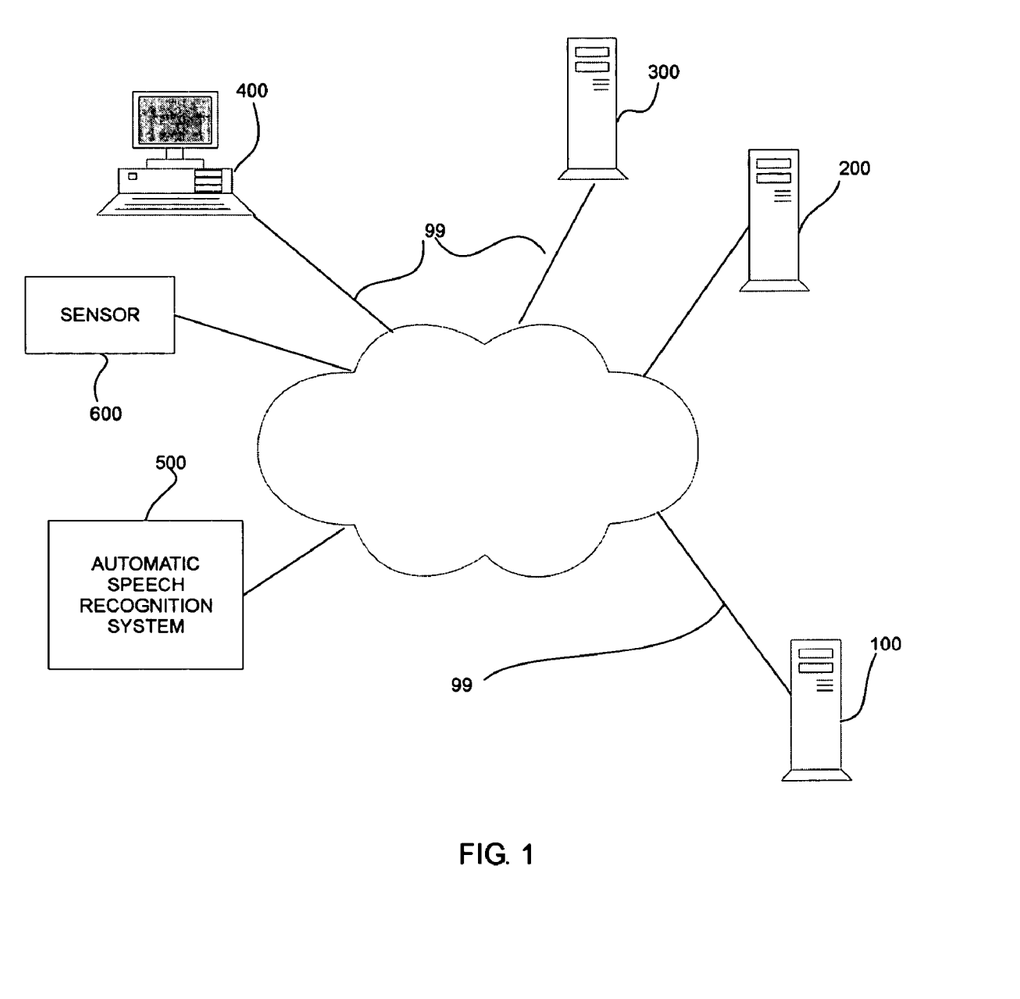
FIG. 1 is an overview of an exemplary system for determining predictive interaction models according to one aspect of this invention.

FIG. 1 is an overview of an exemplary system for determining predictive interaction models according to one aspect of this invention. The system for determining predictive interaction models 100 is connected via communications link 99 to a system for determining interactions 200; an information repository 300; an internet-enabled personal computer 400; an automatic speech recognition system 500; and a sensor device 600, such as a microphone, a video capture system or any other device capable of capturing prosodically modulated natural language information.

In one of the various exemplary embodiments according to this invention, a user of the internet-enabled personal computer 400 requests the determination of predictive interaction models based on turn annotated speech-based training instances contained in the information repository 300. It will be apparent that speech information includes, but is not limited to, orally encoded natural language speech, signed natural language gestures and/or hand, body, pen, and device gestures and/or any prosodically modulated natural language information. The speech-based training instances are forwarded over the communications links 99 to the automatic speech recognition system 500 where the recognized speech information is determined. The discourse functions in the recognized speech information and the prosodic features in each speech-based training instance are determined and associated with turn information to determine a predictive interaction model.

In another exemplary embodiment according to this invention, a user of the internet-enabled personal computer 400 requests the retrieval of information contained in the information repository 300 using a speech request. The speech request is mediated by the system for determining interactions 200. The speech request is forwarded over the communications links 99 to the automatic speech recognition system 500 where the recognized speech information is determined. The recognized speech is forwarded over communications links 99 to the system for determining interactions 200 where a prediction of the likelihood of a turn is determined. The turn prediction is then returned to the internet-enabled personal computer 400.

While the speech request is processed, the user of the internet-enabled personal computer 400 issues a file-save-as voice command to a speech-enabled word processing application. During the speech based file-save-as dialogue, the previously requested information becomes available. Although the two speech-based interactions use different speech processing systems, both of the speech processing systems use exemplary embodiments of the system for determining interactions 200 to schedule the presentation of information to the user.

Thus, the requested information is not presented over the file-save-as dialogue. Instead, discourse functions and prosodic features are monitored and used with a previously determined predictive interaction model to determine the appropriate turn and/or politeness interruption markers to be used in the dialogue.

In another exemplary embodiment according to this invention, the user of microphone or sensor device 600 uses speech to request a temperature control system in the internet-enabled personal computer 400 to set the house temperature to thirty degrees Celsius. However, the request to the temperature control system is immediately followed by speech from Jane. "Hi John, I see you've set the temperature for me, please set it back to twenty seven, I really don't mind the cold." The temperature control system prepares the confirmation message "The temperature has been set to thirty degrees Celsius" and requests a turn prediction from the system for determining interactions 200 over communications links 99. The turn prediction allows the temperature control system to avoid barging in over Jane's speech. Instead, the temperature control system uses the received turn prediction to delay scheduling any confirmation message until after Jane has finished speaking but before John is predicted to respond to Jane.

In still other exemplary embodiments according to this invention, if an appropriate turn or interruption point is not predicted within a reasonable period and/or the presentation information is too critical to delay, the system for determining interactions adds politeness interruption markers to the presentation information. Politeness interruption markers include but are not limited to phrases such as "Excuse me but <presentation information>", "I hate to interrupt, however <presentation information>" and the like. For example, if the temperature confirmation information is critical information, then the system for determining interactions 200 adds politeness interruption markers to generate, schedule and/or present the phrase "Excuse me John, the temperature has now been set to thirty degrees Celsius". The politeness interruption marker alerts the dialogue participants to a possible dialogue discontinuity and allows the focus of the participants' attention to be selectively re-directed to the presentation information.

The approximation of typical human-human dialogue interactions by the system for determining user interactions 200 reduces the cognitive load on dialogue participants. That is, the cognitive load of interacting with the system is reduced when the information is presented in a manner expected by the user.

Figure 2:
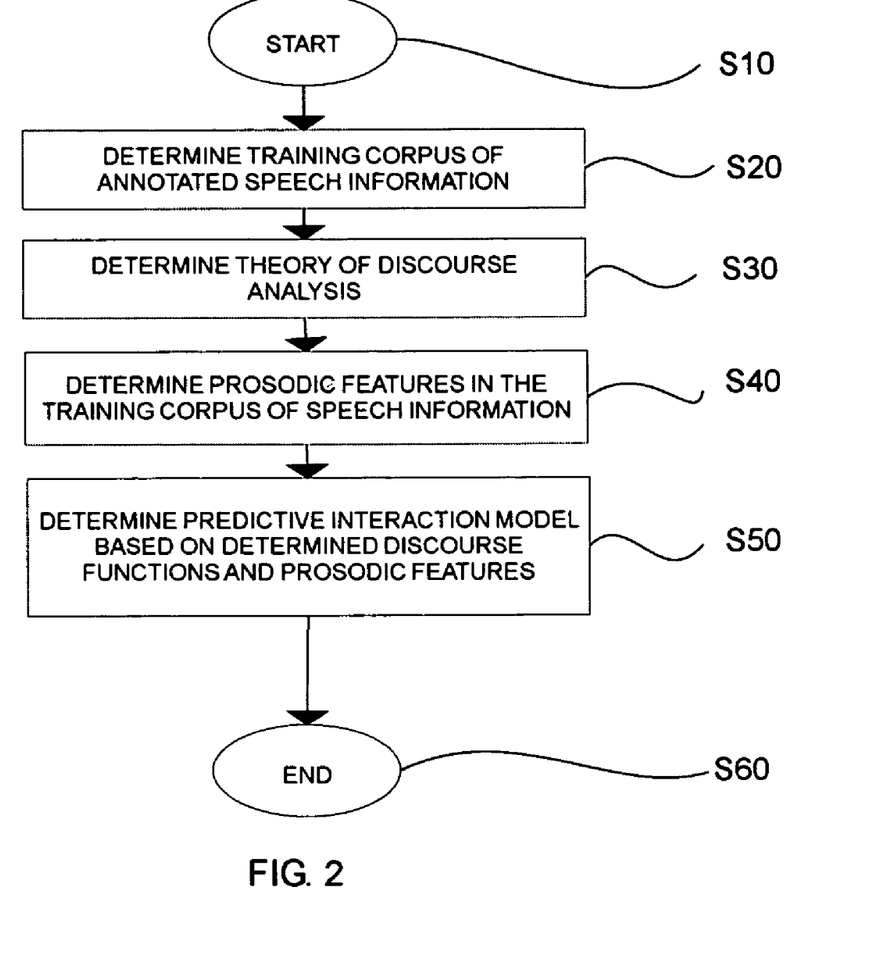
FIG. 2 is an exemplary method for determining predictive interaction models according to this invention.

FIG. 2 is an exemplary method for determining a predictive interaction model according to this invention. The process begins at step S10 and continues immediately to step S20.

In step S20, a training corpus of annotated recognized speech information is determined. The annotated recognized speech information may be obtained from the automatic recognition of a corpus of speech information such the Switchboard Corpus of the Linguistic Data Consortium and the like. The training corpus of recognized speech information is annotated with turn, discourse function and prosodic feature information. In various exemplary embodiments according to this invention, the discourse function information is based on a theory of discourse analysis. The turn information indicates when the speaker has invited other dialogue participants to continue the conversation. The turn taking information may be indicated using an extensible markup (XML) tag or any other type of indicator or marker. The turn information is typically encoded into the speech information manually by a human coder but may also be determined automatically based on the theory of discourse analysis determined in step S30.

The theory of discourse analysis may include but is not limited to the Unified Linguistic Discourse Model (ULDM) of Polanyi et al., described in co-pending U.S. patent application Ser. No. 10/684,508, herein incorporated by reference in its entirety, Rhetorical Structures Theory, or any other known or later developed theory of discourse analysis capable of determining discourse functions in the recognized speech information.

The discourse functions are intra-sentential and/or inter-sentential phenomena that are used to accomplish task, text and interaction level discourse activities such as giving commands to systems, initializing tasks identifying speech recipients and marking discourse level structures such as the nucleus and satellite distinction described in Rhetorical Structures Theory, the coordination, subordination and N-aries, as described in the ULDM and the like. Thus, in some cases, the discourse constituent of the selected theory of discourse analysis may correlate with a type of discourse function.

The discourse function information may be determined automatically or may be entered manually. For example, the ULDM discourse parser may be used to automatically annotate or segment the recognized speech information into discourse functions. In various other exemplary embodiments according to this invention, human coders segment the recognized speech information into discourse functions and/or annotate the recognized speech information with discourse functions codes or tags.

It will be apparent that the recognized speech information in the training corpus may reflect the speech of a large group of speakers, a specific speaker, a specific speech genre or any other known or statistically significant grouping of speech information without departing from the scope of this invention. After the theory of discourse analysis has been determined, control continues to step S40.

In step S40, prosodic features in the corpus of speech information are determined. The prosodic features include but are not limited to initial pitch frequencies, silence durations, volume, stress, boundary tones, number of intonation boundaries, change in frequency and the like. After the prosodic features in the speech have been determined, control then continues to step S50.

In step S50, a predictive interaction model is determined. The predictive interaction model associates the annotated turn information with identified prosodic features and discourse functions. The associations may be determined using statistics, machine learning, rules and/or any other known or later developed method. It will be apparent that in various other exemplary embodiments according to this invention, other sources of turn information may also be used.

A predictive interaction model is then determined. The predictive interaction model accepts prosodic features and a current discourse function and returns the likelihood that the next discourse function is associated with a turn event in the dialogue. The turn indicator may be a binary yes/no indicator, a likelihood percentage or any other known or later developed indicator of the likelihood of a turn. It will be apparent that in various exemplary embodiments according to this invention a prior predictive interaction model is developed based on leading prosodic feature indicative of a turn. A prior predictive interactive model is useful in interactive settings. For example, a prior predictive model is useful in predicting when an interruption is appropriate or minimally intrusive based on the speech patterns and prosody of the user.

Posterior predictive interactive models are also developed based on leading and/or following prosodic feature indicators. Posterior predictive interaction models are helpful in non-interactive environments. For example, the posterior predictive interaction models are used to differentiate transcript attribution information for multiple speakers in a television program or other multi-speaker setting. The differentiation of multiple speakers is also useful in tailoring language models based on speaker identify and/or performing various other non-interactive processing tasks. The predictive interaction model is determined based on machine learning, Naïve Bayes, decision trees and the like. The predictive interaction model is then saved to memory and/or used. Control then continues to step S60 and the process ends.

Figure 3:
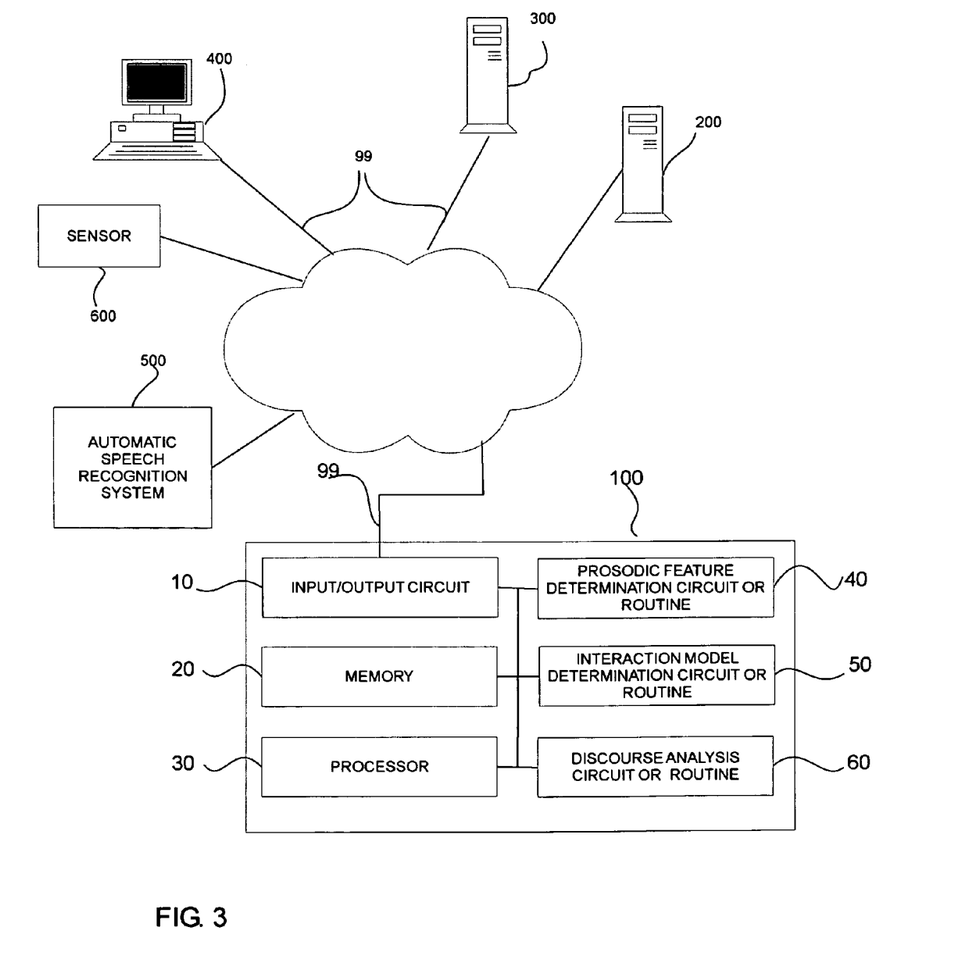
FIG. 3 shows an exemplary system for determining predictive interaction models according to this invention.

FIG. 3 shows an exemplary system for determining a predictive interaction model according to this invention. The system for determining predictive interaction models 100 is comprised of a memory 20; a processor 30; a prosodic feature determination circuit or routine 40; an interaction model determination circuit or routine 50; and a discourse analysis circuit or routine 60 each connected to the input/output circuit 10, and via communications link 99 to an information repository 300; an internet enabled personal computer 400; an automatic speech recognition system 500 and a sensor device 600 such as a microphone, a video capture device or any other device capable of capturing prosodically modulated natural language information.

A user of an internet-enabled personal computer 400 initiates a request to determine a predictive interaction model according to one aspect of this invention. The request is forwarded over the communications links 99 and mediated by the system for determining predictive interaction models 100.

The system for determining predictive interaction models 100 retrieves turn annotated speech training instances from the information repository 300 by activating input/output circuit 10. The system for determining predictive interaction models 100 forwards the turn annotated speech training instances to the automatic speech recognizer 500 where the annotated recognized speech is determined. The processor 30 retrieves the turn annotated recognized speech and stores it in the memory 20.

The processor 30 activates the prosodic feature determination circuit or routine 40. The prosodic feature determination circuit or routine 40 determines the prosodic features in the turn annotated speech training instances. For example, the initial pitch frequency, preceding and following silence durations, volume, change in pitch frequency, stress, number of intonational boundaries are identified in the turn annotated speech training instances. However, it should be apparent that any known or later developed prosodic feature useful in determining interaction models may also be used without departing from the spirit or scope of this invention.

The processor 30 activates the discourse analysis circuit or routine 60 to determine discourse functions in the recognized speech information. The discourse analysis routine or circuit 60 uses a theory of discourse analysis such as the ULDM, Rhetorical Structures Theory or any other known or later developed method of determining the discourse functions in the recognized speech information.

The processor 30 then activates the interaction model determination circuit or routine 50. The interaction model determination circuit or routine 50 uses Naive Bayes, decision trees, rules or any other known or later developed method for determining a predictive interaction model based on the identified prosodic features and the discourse functions in the annotated recognized speech information. The predictive interaction model is then returned to the user of the internet-enabled personal computer 400 for use and/or saved for future use.

Figure 4:
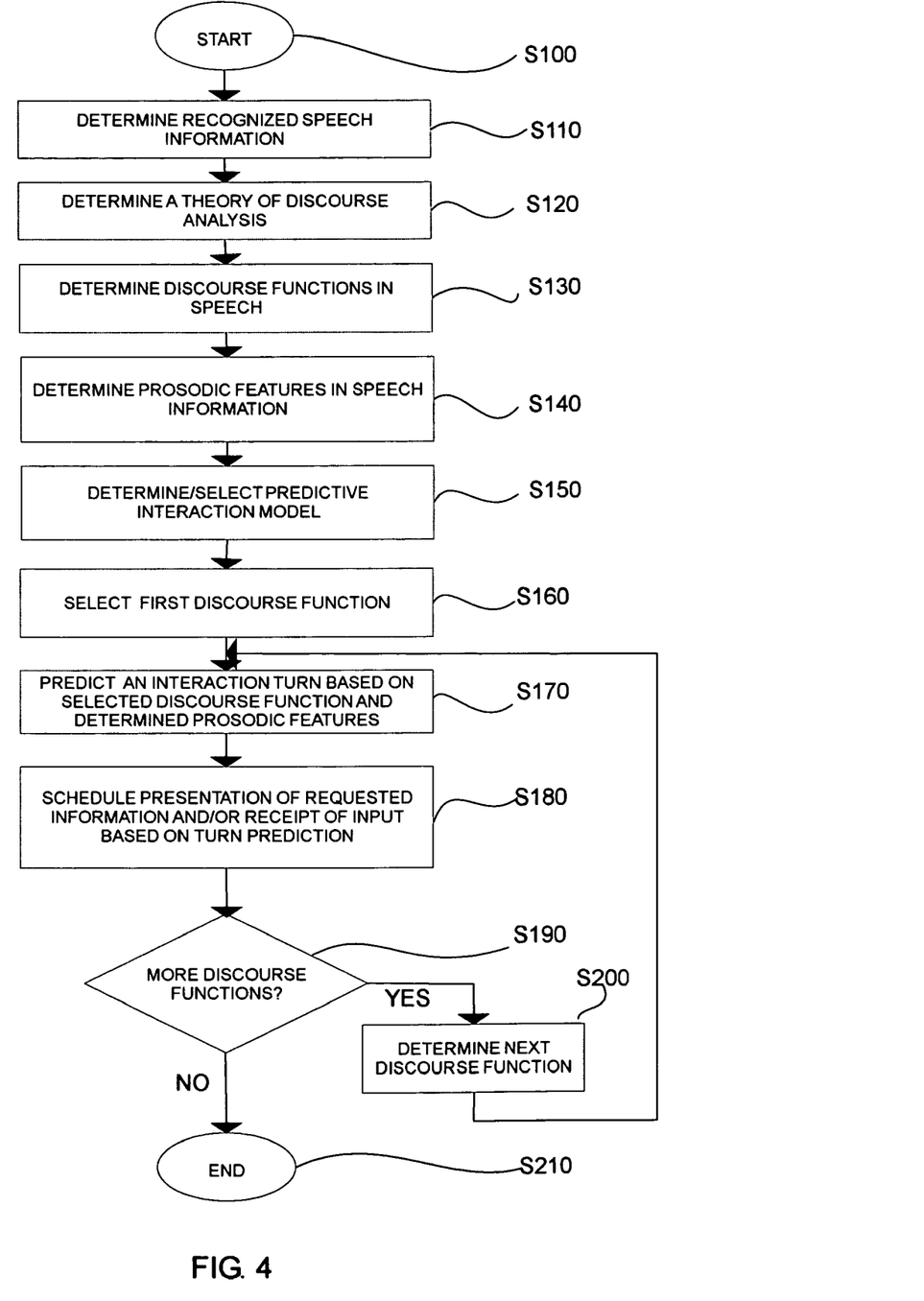
FIG. 4 is an exemplary method of determining interactions according to one aspect of this invention.

FIG. 4 is an exemplary method of determining interactions according to one aspect of this invention. The process begins at step S100 and immediately continues to step S110.

In step S110, the recognized speech information is determined. The recognized speech information may originate from a telephone, a microphone array monitoring a room, a passenger compartment of an automobile, a recorded transcript or any other known or later developed source of speech information. After the recognized speech information has been determined. Control continues to step S120 where the theory of discourse analysis is determined.

The theory of discourse analysis may be determined based on a user profile entry, a user selection form a dialogue box, or using any other known or later developed method. After the theory of discourse analysis has been determined, control continues to step S130 where the discourse functions in the speech are determined.

In various exemplary embodiments according to this invention, the discourse functions in the speech are determined based on a theory of discourse analysis, a predictive model for discourse functions or any other method for determining discourse functions in the speech information. As discussed above, discourse functions in the speech information are intra-sentential and/or inter-sentential phenomena that are used to accomplish task, text and interaction level discourse activities such as giving commands to systems, initializing tasks identifying speech recipients and marking discourse level structures such as the nucleus and satellite distinction described in Rhetorical Structures Theory, the coordination, subordination and N-aries, as described in the ULDM and the like. After the discourse functions in the speech information have been determined, control continues to step S140.

In step S140, the prosodic features in the speech information are determined. The prosodic features include but are not limited to initial pitch frequency, volume, location and/or duration of silences in the speech, changes in pitch frequency and the like. Control then continues to step S150.

The predictive interaction model is selected and/or determined in step S150. The predictive interaction model is determined based on a user profile, the language, genre or various other characteristics of the speech information. For example, in one of the various exemplary embodiments according to this invention, a voice-print sub-module identifies the voice of the user. A user specific interaction model is then loaded from a predictive interaction storage structure based on the determined identity of the user. In this way, idiolectic or user specific prosodic features and idiolectic or user specific information presentation techniques are identified and used to increase the accuracy of the interaction model. However, it should be apparent that speaker independent predictive interaction models can also be used without departing from the spirit or scope of this invention. After the predictive interaction model is determined, control continues to step S160.

In step S160, the first discourse functions is selected for processing. Control then continues to step S170 where a turn is predicted based on the identified prosodic features and the determined discourse functions.

In one of the various exemplary embodiments according to this invention, an anterior/prior or leading predictive model is determined. The anterior predictive model uses prosodic features and discourse function information preceding the turn in the dialogue to predict the likelihood that the next discourse function occurs after a turn. In other exemplary embodiments according to this invention, the predictive interaction model is a posterior or following interaction model. The posterior interaction model predicts the likelihood that a turn occurred in a prior sequence of discourse functions. After the turn prediction has been determined, control continues to step S180.

In step S180, the turn prediction is used to process the requested responses. For example, in various exemplary embodiments according to this invention, the turn prediction is used to schedule the presentation of the requested information retrieved from an information repository, a voice response unit or other type of information source. In this way, the requested information is presented as part of the flow of the dialogue. Since the requested information is presented at an appropriate point and/or with an appropriate politeness interruption marker, the cognitive load associated with processing the information is reduced. In multi-participant and/or multi-device environments, scheduling the presentation of requested information based on the turn prediction better integrates the requested information into the flow of the group dialogue.

In still other exemplary embodiments according to this invention, the turn prediction may also be used to dynamically add politeness interruption markers such as "Excuse me, but" or other interruption phrases. These interruption phrases help focus the attention of the dialogue participants on the new information and inform participants if the new information requires immediate attention. The interruption markers may also be used to inform the dialogue participants that the information may not directly relate to the current dialogue topic. Similarly, politeness interruption markers may be eliminated when the turn prediction indicates a response is currently anticipated or not required by the language, urgency and/or other factors. The presentation of salient information at appropriate points in the dialogue helps reduces the cognitive load on the user. After a response has been prepared and/or scheduled based on the turn prediction, control continues to step S190.

In step S190, a determination is made whether there are additional discourse functions to be processed. If it is determined that there are additional discourse functions to be processed, control continues to step S200. In step S200, the next discourse function in the recognized speech information is determined. After the next discourse function has been determined, control jumps to step S170. The steps S170-S200 are then repeated until it is determined in step S190 that no additional discourse functions remain to be processed. Control then continues to step S210 and the process ends.

Figure 5:
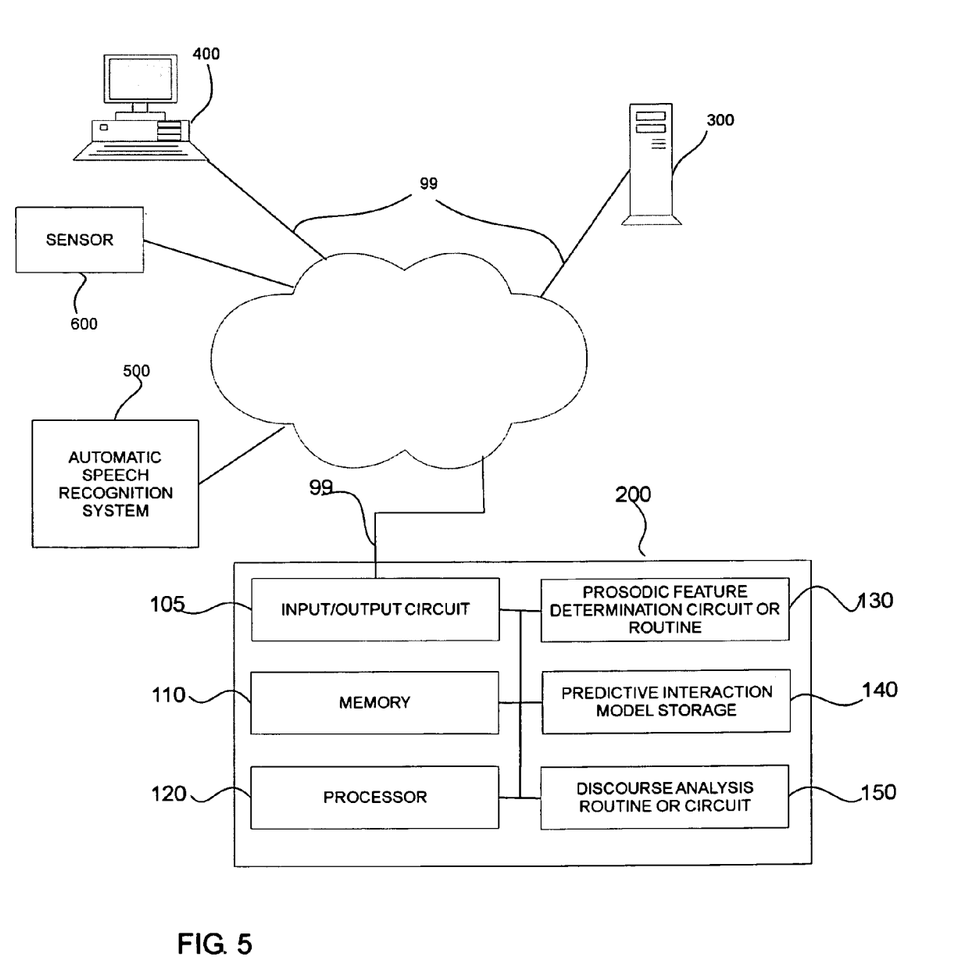
FIG. 5 is a exemplary system for determining interactions according to one aspect of this invention.

FIG. 5 is a exemplary system for determining interactions 200 according to one aspect of this invention. The system for determining interactions 200 is comprised of a memory 110; a processor 120; a prosodic feature determination circuit or routine 130; predictive interaction model storage 140; and a discourse analysis routine or circuit 150, each connected via input/output circuit 105 to communications link 99 and to an information repository 300; an internet-enabled personal computer 400, an automatic speech recognition system 500; and a sensor 600.

A user of the sensor device 600 or other prosodically modulated natural language input device requests a change in the temperature from 25 to 30 degrees Celsius. After the user of the sensor device 600 initiates the temperature change request, the user begins an interaction with another system controlled by a natural language interface. The speech information is forwarded via the communications links to the automatic speech recognition system 500.

The processor 120 of the system for determining interactions activates the input/output circuit 100 to retrieve the speech information and the recognized speech from the automatic speech recognition system 500. The recognized speech information is stored in memory 110.

The processor 120 then activates the discourse analysis routine or circuit 150 to determine the discourse functions in the recognized speech. The discourse analysis routine or circuit 150 may use a theory of discourse analysis such as the ULDM, Rhetorical Structures Theory and/or any known or later developed method of determining discourse functions in the speech information.

The processor 120 activates the prosodic feature determination circuit 130 to determine the prosodic features in the speech. The prosodic features may include, but are not limited to initial pitch frequency, volume, location and/or duration of silences in the speech, changes in pitch frequency and the like.

The processor 120 retrieves a predictive interaction model from the predictive interaction model storage structure 140. In various exemplary embodiments according to this invention, the predictive model is determined using machine learning, statistical analysis, based on rules or determined using any other method and stored in the predictive interaction model storage 140. However, it will be apparent that the predictive interaction model may also be dynamically determined without departing from the spirit or scope of this invention.

The predictive interaction model is typically an incremental predictive interaction model that learns incrementally. That is, in various other exemplary embodiments according to this invention, the dynamic collaborative grounded truth feedback mechanisms of Thione et al., as described in co-pending co-assigned U.S. patent application Ser. No. 10/768, 675, entitled "Systems and Method for Collaborative Note-Taking", and filed Feb. 2, 2004, are used to incrementally update the predictive interaction model. However, it will be apparent that static predictive interaction models may also be used in the practice of this invention.

The processor 120 then applies the retrieved predictive interaction model to the determined discourse functions and the determined prosodic feature information. The predictive interaction model returns a prediction. The value of the prediction reflects the likelihood that a turn between dialogue participants has occurred or will occur after the current discourse function. As discussed above, prior or leading prediction interaction models return prediction values useful in determining a dialogue turn in an interactive environment. Various other exemplary embodiments according to this invention use posterior or trailing prediction predictive interaction models, either alone or in combination with the prior predictive interaction models. The prediction values returned by the posterior or trailing predictive interaction models are helpful in dictation and other non-interactive and/or delay tolerant environments. Responses and/or further input are scheduled based on the determined prediction model.

Figure 6:
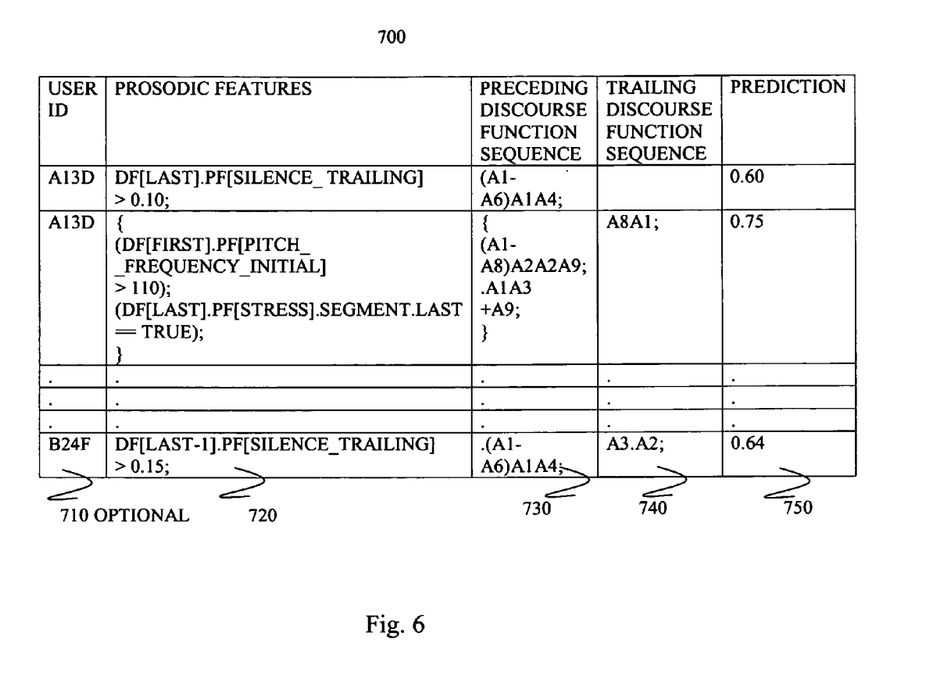
FIG. 6 is an exemplary data structure for storing predictive models according to one aspect of this invention.

FIG. 6 is an exemplary data structure for storing predictive models 700 according to one aspect of this invention. The data structure for storing predictive interaction models 700 is comprised of a an optional user identifier 710; a prosodic features portion 720; a preceding discourse function sequence portion 730; a trailing discourse function sequence portion 740; and a prediction portion 750.

The optional user identifier 710 uniquely associates a specific user with a specific interaction model. The user identifier may be an alphanumeric identifier, a uniquely identified name or any other information that uniquely identifies the user with a predictive interaction model.

The prosodic feature portion 720 contains prosodic features associated with an exemplary predictive interaction model. For example, the silence following a discourse function is a prosodic feature that may indicate a turn in the dialogue. Similarly, the initial pitch of discourse functions in a sequence of one or more discourse functions, stress on one or more discourse function segments, or any other consistent prosodic feature may be used to predict turns in the dialogue.

The preceding discourse function sequence portion 730 contains information about the sequence of discourse function types likely to precede any predicted turn. Speaker independent preceding discourse function sequences may be determined based on the grammar and syntax rules of the dialogue language. However, in various other exemplary embodiments according to this invention, variations of the presentation strategies required by the dialogue language may be based on the user, the genre and/or any other known or later developed speech characteristic.

The discourse function sequences in the preceding discourse function sequences portion 730 are illustrated using a two letter code to represent each type of discourse function. Multiple sequences of preceding discourse functions may be associated with multiple prosodic features. For example, in one of the exemplary embodiments according to this invention, an AWK or PERL like pattern expression is used to associate one or more sequences of prosodic discourse functions with one or more sequences of preceding discourse functions. The symbol "." matches any type of discourse function. Hyphenated terms in brackets such as "(A1-A9)" represent any single code from the set A1 through A9. The symbol "+" matches a single instance of the code following the symbol. The use of the pattern expression notation described above is merely exemplary. Thus, it will be apparent that any known or later developed method of representing discourse function sequences and/or prosodic features may be used in the practice of this invention.

The trailing discourse function sequence portion 740 contains information about the sequence of discourse function types likely to follow a predicted turn. The trailing discourse function sequences in the trailing discourse function sequences portion 740 are also illustrated using a two letter code to represent each type of discourse function and associate discourse function sequences with prosodic features. The prediction portion 750 reflects the likelihood that the predictive interaction model correctly predicts a turn.

The first row of the data structure for storing predictive interaction models 700 contains the value "A13D" in the user id portion 710. This indicates that the predictive interaction model is associated with the user identified as "A13D". The predictive interaction model may utilize presentation strategies specific to the speech patterns of user "A13D" to predict turns in the dialogue. The user may be identified to the system for determining interactions using voice print recognition, a user login process or any other known or later developed method of identifying the user.

The prosodic features portion 720 of the first row of the exemplary data structure for storing predictive interaction models 700 contains the value "DF[LAST].PF[SILENCE_FOLLOWING]>0.10". This indicates that if the silence following the prosodic feature associated with the "LAST" discourse function in the sequence exceeds "0.10" seconds and the preceding discourse function sequence constraints are satisfied, then a turn is predicted with a 60% probability.

The preceding discourse function portion 730 contains the value "(A1-A6)A1A4;". This indicates that a characteristic three discourse function sequence precedes the turn. The discourse function sequence starts with any one discourse function from the set of discourse functions of type "A1 through A6". The second and third preceding discourse functions in the preceding discourse sequence are discourse functions of type A1 and A4.

The trailing discourse function sequence 740 is empty. This indicates that the first row of the exemplary data structure for storing predictive interaction models is associated with an anterior/prior or leading predictive interaction model. Thus, since the turn prediction is not conditioned on one or more trailing discourse function sequences, the predictive interaction model is well suited to interactive environments.

The prediction portion 750 of the exemplary data structure for storing predictive interaction models contains the value 0.60. This value indicates the likelihood of a turn if the prosodic and discourse function constraints are satisfied.

The second row of the data structure for storing predictive interaction models 700 also contains the value "A13D" in the user id portion 710. This indicates that the predictive interaction model encoded in the second row is also associated with the user identified as "A13D". The predictive interaction model in the second row has values in the trailing discourse function sequence portion 740. This indicates that the predictive interaction model is a posterior predictive interaction model. Thus, the posterior predictive interaction model may be selected for transcription or other non-interactive tasks.

The prosodic features portion 720 of the second row of the exemplary data structure for storing predictive interaction models 700 contains the value:

$$\{(DF[FIRST].PF[PITCH\_FREQUENCY\_INITIAL] > 110); \qquad (1)$$

$$(DF[LAST].PF[STRESS].$$
$$SEGMENT.LAST == TRUE);\}$$

This indicates that if the initial pitch frequency associated with the "FIRST" discourse function in the discourse function sequence is greater than 110 Hz and there is a stress on the last segment of the last discourse function, and the preceding and trailing discourse function sequence constraints are satisfied, then a turn is predicted with a probability of 75%. The turn prediction value is higher since this predictive interaction model is a posterior or trailing model that uses prior and posterior prosodic features and prior and posterior discourse function sequences.

The preceding discourse function portion 730 contains the value "(A1-A8)A2A2A9; .A1A3+A9;". This indicates that either of two characteristic discourse function sequences precedes the predicted turn. The first and second sequence of discourse functions are separated by the ";" symbol.

The first discourse function sequence starts with any one of the discourse functions from the set A1-A8. The second and third discourse functions in the first sequence are discourse functions of type "A2". The fourth discourse function in the first sequence is a discourse function of type "A9".

The second discourse function sequence starts with the "." symbol. This symbol matches any type of discourse function. Thus, the second sequence reflects a pattern that matches the tail or ending of a string of discourse functions starting with a discourse function of any type. The second discourse function in the sequence is a discourse function of type "A1". The third discourse function in the sequence is a discourse function of type "A3". The "+" symbol is used to indicate that at least one discourse function of type "A9" must follow.

The trailing discourse function sequence portion 740 contains the value "A8A1". The presence of a trailing discourse function sequence portion indicates that the second row of the exemplary data structure for storing predictive interaction models is associated with posterior or trailing predictive interaction model. The predictive interaction model is not well suited to interactive environments since the turn prediction is conditioned a trailing discourse function sequence. The trailing discourse function sequence portion 740 requires that a discourse function of type "A8" immediately follow a turn followed by a discourse function of type "A1".

The prediction portion 750 of the exemplary data structure for storing predictive interaction models contains the value 0.75. This value indicates the likelihood of a turn if the prosodic and discourse function constraints are satisfied.

The last row of the data structure for storing predictive interaction models 700 contains the value "B24F" in the user id portion 710. This indicates that the predictive interaction model is associated with the user identified as "B24F". As discussed above, the user is identified to the system for determining interactions using voice print recognition, a user login process or any known or later developed method of identifying the user to the system for determining interactions.

The prosodic features portion 720 of the last row of the exemplary data structure for storing predictive interaction models 700 contains the value "DF[LAST-1].PF[SILENCE_TRAILING]>0.15". This indicates that if the "LAST-1" discourse function is followed by a trailing silence greater than "0.15" seconds and the preceding and trailing discourse function sequence constraints are satisfied, then a turn is predicted with a probability of 64%.

The preceding discourse function portion 730 contains the value "(A1-A6)A1A4". This indicates that a characteristic three discourse function sequence precedes the turn. The discourse function sequence starts with any one of discourse function from the set of discourse functions "A1 through A6". The second and third preceding discourse functions in the preceding discourse sequence are discourse functions of type A1 and A4.

The trailing discourse function sequence 740 contains the value "A3.A2". This indicates that the interaction model is a posterior or trailing interaction model not well suited to interactive environments. The "." symbol matches with any type of discourse function. Thus, the three discourse function sequence starts with a discourse functions of type "A3" followed by a discourse function of any type and in turn followed by a discourse function of type "A2".

The prediction portion 750 of the exemplary data structure for storing predictive interaction models contains the value "0.64" indicating the likelihood of a turn if the prosodic and discourse function constraints are satisfied.

Each of the circuits 10-60 of the system for determining predictive interaction models 100 described in FIG. 3 and circuits 100-150 of the system for determining interactions 200 described in FIG. 5 can be implemented as portions of a suitably programmed general-purpose computer. Alternatively, circuits 10-60 and 100-150 outlined above can be implemented as physically distinct hardware circuits within an ASIC, or using a FPGA, a PDL, a PLA or a PAL, or using discrete logic elements or discrete circuit elements. The particular form each of the circuits 10-60 of the system for determining predictive interaction models 100 and 100-150 of the system for determining interactions 200 as outlined above will take is a design choice and will be obvious and predicable to those skilled in the art.

Moreover, the system for determining predictive interaction models 100 and the system for determining interactions 200 and/or each of the various circuits discussed above can each be implemented as software routines, managers or objects executing on a programmed general purpose computer, a special purpose computer, a microprocessor or the like. In this case, the system for determining predictive interaction models 100 and the system for determining interactions 200 and/or each of the various circuits discussed above can each be implemented as one or more routines embedded in the communications network, as a resource residing on a server, or the like. The system for determining predictive interaction models 100 and the system for determining interactions 200 and the various circuits discussed above can also be implemented by physically incorporating the system for determining a predictive interaction model 100 and/or the system for determining interactions 200 into software and/or a hardware system, such as the hardware and software systems of a web server or a client device.

As shown in FIGS. 3 and 5, memory 20 and 110 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 3 and 5 can each be any known or later developed device or system for connecting a communication device to the system for determining predictive interaction models 100 and the system for determining interactions 200, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining user interactions comprising:
   determining speech information;
   determining discourse functions and prosodic features in the speech information;
   selecting a predictive interaction model, the predictive interaction model developed by associating discourse functions and prosodic features of a training corpus of turn annotated speech with turn information of the training corpus of turn annotated speech; and
   determining an interaction turn, in the speech information, based on the predictive interaction model and the discourse functions of the speech information and the prosodic features of the speech information
   wherein the predictive interaction model accepts the prosodic features of the speech information as one input and a current discourse function of the speech information as another input and determines a likelihood that a next discourse function is associated with the interaction turn.

2. The method of claim 1, in which the discourse functions are determined from automatically recognized speech information.

3. The method of claim 1, further comprising the step of scheduling an interaction event based on the turn prediction.

4. The method of claim 1, in which the prosodic features include at least one of: a silence preceding a discourse functions; a silence following a discourse function; rate of speech; pitch frequency; changes in pitch frequency and volume.

5. A method of determining a predictive interaction model comprising:
   determining a training corpus of turn annotated speech information;
   determining discourse functions and prosodic features associated with a turn information of the turn annotated speech information; and
   determining a predictive interaction model based on the discourse functions, the prosodic features and the turn information,
   wherein the predictive interaction model is adapted to accepting the prosodic features of a speech information as one input and a current discourse function of the speech information as another input and determining a likelihood that a next discourse function is associated with the turn information.

6. The method of claim 5, in which the predictive interaction model is determined based on at least one of machine learning, decision tree, Naive Bayes, rules and statistics.

7. A system for determining interactions comprising:
   an input/output circuit for retrieving recognized speech and prosodic features;
   a processor that determines speech information; and discourse functions and prosodic features in the speech information; determines a predictive interaction model; and determines an interaction turn based on the predictive interaction model and the discourse functions and prosodic features in the speech information
   wherein the predictive interaction model accepts the prosodic features of the speech information as one input and a current discourse function of the speech information as another input and determines a likelihood that a next discourse function of the speech information is associated with the interaction turn.

8. The system of claim 7, in which the discourse functions are determined from automatically recognized speech information.

9. The system of claim 7, in which the processor also schedules an interaction event based on the turn prediction.

10. The system of claim 7, in which the prosodic features include at least one of: a silence preceding a discourse functions; a silence following a discourse function; rate of speech; pitch frequency; changes in pitch frequency and volume.

11. A computer readable storage medium embodying a set of instructions, the set of instructions, when executed by one or more processors, causing the one or more processors perform a method for determining interactions, the method comprising:
    determining speech information;
    determining discourse functions and prosodic features in the speech information;
    determining a predictive interaction model, the predictive interaction model being developed by associating discourse functions of a training corpus of turn annotated speech and prosodic features of the turn annotated speech with turn information of the turn annotated speech; and
    determining an interaction turn based on the predictive interaction model and the determined discourse functions and prosodic features,
    wherein the predictive interaction model accepts the prosodic features of the speech information as one input and a current discourse functions of the speech information as another input and determines a likelihood that a next discourse function is associated with the interaction turn.

12. The method of claim 1, in which the speech information is at least one of: verbal natural language information and non-verbal natural language information.

13. The method of claim 12, in which the non-verbal information is at least one of: sign language gestures, pen gestures, hand gestures, body gestures and facial gestures.

14. The method of claim 5, in which the speech information is at least one of: verbal information natural language and non-verbal natural language information.

15. The method of claim 13, in which the prosodic features include at least one of: facial expressions, gesture velocity, and gesture force.

16. The method of claim 1, wherein the discourse functions are determined based on a theory of discourse analysis.

17. The method of claim 16, wherein, the theory of discourse analysis is at least one of: the Linguistic Discourse Model, the Unified Linguistic Discourse Model, Rhetorical Structures Theory, Discourse Structure Theory and Structured Discourse Representation Theory.

18. The method of claim 5, in which the discourse function determined based on a theory of discourse analysis.

19. The system of claim 7, in which the discourse functions are determined based on a theory of discourse analysis.

20. The system of claim 19, in which the theory of discourse analysis is at least one of: the Linguistic Discourse Model, the Unified Linguistic Discourse Model, Rhetorical Structures Theory, Discourse Structure Theory and Structured Discourse Representation Theory.

* * * * *